Oct. 26, 1954
F. K. H. NALLINGER
2,692,511
AUTOMATIC GEAR
Filed Jan. 5, 1950
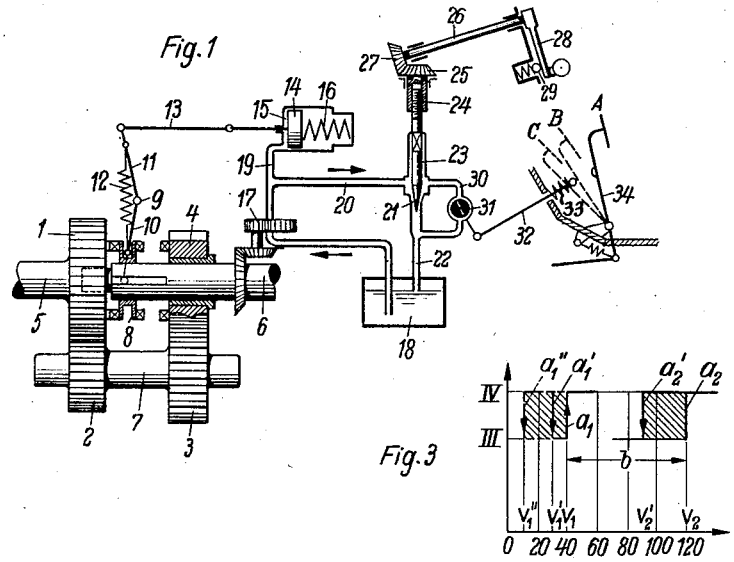
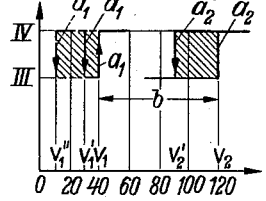
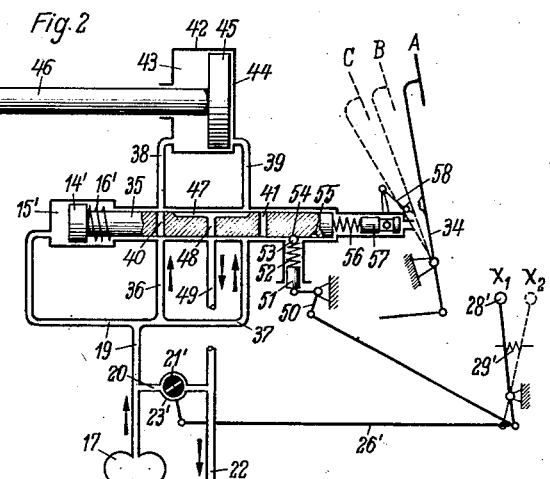
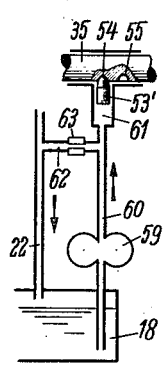
Inventor:
Friedrich K. H. Nallinger
By:
Haseltine, Lake & Co.
Agents

UNITED STATES PATENT OFFICE 2,692,511

AUTOMATIC GEAR

Friedrich K. H. Nallinger, Stuttgart, Germany, assignor to Daimler-Benz Aktiengesellschaft, Stuttgart-Unterturkheim, Germany Application January 5, 1950, Serial No. 136,866

Claims priority, application Germany January 5, 1949

16 Claims. (Cl. 74—472)

This invention relates to a change speed gear, more particularly an over-drive gear for motor vehicles which is controlled automatically in dependence on the number of revolutions of the motor or the speed of the car.

In known gears of this kind, the control is normally effected in such a way that the gear is automatically shifted from a lower to a higher rate of speed, e. g. from direct driving (transmission ratio 1:1) to over-drive or the engaging of the new speed is prepared or "preselected," at a predetermined number of revolutions of a shaft or at a predetermined speed of the car. In case of preselection, the shifting normally takes place only when the gas is shut off the next time following the preselecting step. However, this fully or semi-automatic operation adapted to a predetermined speed is not always desirable. The driver oftentimes has to face situations where he would rather avoid the automatic shifting or preselecting of a higher or lower speed; thus, for instance where he wants to drive uphill at a high speed, it is undesirable that the over-drive be preselected in driving on a level stretch of the road and engaged when the gas is shut off before a curve, while the gear is shifted down to the next lower speed or direct drive after the curve. Also in driving downhill, for instance on mountain roads including many curves, it is not desirable as a rule that the over-drive be thrown in each time in the intermediate stretches between two curves.

It is the object of the invention to provide means for removing this disadvantage.

With this and further objects in view, which will hereinafter appear, according to the invention the gear is designed in such a way that the speed of the car at which the gear is automatically shifted or preselected from one rate of speed to another can be adjusted to different values, i. e. more particularly from the driver's seat. For instance, if the car can be driven in direct transmission up to a speed of 120 kms. per hour, means may be provided for selective adjustment, on the part of the driver, of automatic shifting (or preselection) from direct to over-drive transmission within a range from 40 kms. per hour to 120 kms. per hour. According as it is intended to drive at a high average speed or moderately, in the open country or in town, at a higher or lower fuel consumption in the open country or in the mountains, it is thus possible to adapt the automatic function of the gear to the desired purpose and yet to save gear-shifting by the driver.

Moreover, in order to avoid a too frequent and troublesome change of speed in driving at a speed causing response of the automatic gear control, the gear is advantageously designed in such a way that the gear shifting takes place with a certain intentional hysteresis, in such a manner that the down-shifting, for instance from the over-drive to the direct drive, takes place at another and lower speed of the car than the up-shifting for instance from the direct drive to the over-drive. The amount of this hysteresis may be equal at all speeds or it may be adapted to the instantaneous adjusted speed, for instance in a proportional ratio, whereby the requirements of the driver can be met equally well in case of high average speed or moderate driving.

It is moreover contemplated in accordance with the invention, in connection with the adjustibility of the speed determining the change of gear, to provide operation of the accelerating member of the motor, i. e. the gas lever, in such a manner that by operation thereof beyond the full out position in case of thrown-in over-drive, down-shifting to the lower speed is effected. Advantageously in this case the operating member is supported in the full load position by a device which can be felt as a pressure cushion against action of which the further movement takes place. It is thus possible at any time, even when the adjusted critical speed has not yet been reached, to throw in the lower gear and thus to impart to the car the maximum possible acceleration at a higher torque.

Other and further objects, features and advantages of the invention will be pointed out hereinafter and appear in the appended claims forming a part hereof.

In the accompanying drawing several now preferred embodiments of the invention are shown by way of illustration and not by way of limitation.

Figure 1 is a diagrammatic view of a gear system with hydraulic shifting mechanism having the invention applied thereto, Figure 2 is another embodiment, Figure 3 is a diagram exemplifying the shifting, and Figure 4 is a modification of Figure 2.

Similar reference numerals denote similar parts in the different views.

Referring now to the drawings in greater detail, and first to Figure 1, it will be seen that the two-speed gear shown in this figure and arranged in series with the rest of the change-speed gear, comprises two pairs of toothed wheels 1, 2, and 3, 4, the toothed wheel 1 being fixedly mounted on the shaft 5 of the gear (which may be driven, for instance, from the motor through the rest of the change-speed gear), while the toothed wheel 4 is mounted for rotation on the driven shaft 6. The toothed wheels 2 and 3 are fixedly mounted on the countershaft 7 in a manner known per se. A clutch 8 is adapted to couple the driven shaft 6 selectively with the toothed wheel 1 or with the shaft 5 for putting in direct drive (for instance third speed) or with the toothed wheel 4 for engaging a high rate of speed (for instance fourth speed). The claws of the coupling advantageously have bevelled end faces in order to effect the shifting only, or substantially only, in case of synchronism of the members to be coupled, e. g. after throttling down or shutting off.

It will be understood that it is also possible to provide other clutches, for instance friction couplings or electric, hydraulic, pneumatic couplings or other types of couplings, synchronizing couplings or the like, instead of the claw type coupling. Moreover in place of the spur wheel gear as shown, another suitable gear may be provided, for instance a planetary gear in which one rate of speed direct drive, i. e. (transmission ratio 1:1) may be attained for instance by locking the gear in itself, while the other rate of speed is attained by locking a central wheel against rotation, or the like.

In the example as shown the change clutch 8 is controlled by a snap mechanism comprising the levers 10 and 11 which are relatively swingable about their pivot 9, and a tension spring 12 tending to draw the lever and so the coupling 8 into either of their two end positions. The mechanism is operated by a rod 13 connected to the piston 14 sliding in a cylinder 15 and loaded by a spring 16, in such a way that it tends to move the lever 11 and so, through the tension spring 12, the clutch 8, to the left for engagement of the direct drive.

The driven shaft 6 serves to drive, for instance through a gear transmission or the like, a pump 17 conveying oil through a pipe 19 to the cylinder 15 from an oil tank 18 which may simultaneously supply oil for other purposes. A pipe 20 branched off from pipe 19 leads to a throttling device 21 from which the oil is permitted to flow back through the pipe 22 to the tank 18. The cross section of the throttling device 21 is varied by a throttling pin 23 which is non-rotatably mounted and can be axially shifted by a threaded portion 24 in the bevel wheel 25. To this end the bevel wheel 25 may be rotated by a lever 28 and gear 27 mounted for instance on the instrument board, on the steering column or at any other point within the reach of the driver. Notches 29 may be provided for setting the lever 28 to different positions, but continuous adjustment is also possible.

Provided in a branch pipe 30 by-passing the throttling device 21 is a throttling or check-valve 31 normally shutting off the pipe 30 under action of a spring 33 pulling the rod 32 into a right hand end position, but opening the pipe if the motor accelerating lever (gas lever 34 with no-load position A) is depressed beyond the full load position B into an end position C and thereby moves the rod 32 against the action of the spring 33.

The operation is as follows:

By the pump 17 driven by the running car, oil is conveyed from the tank 18 on the one hand into the cylinder 15 and on the other hand, through the throttling device 21, back into the tank 18. The oil conveyed into the cylinder 15 tends to move the piston 14 to the right with a force P, i. e., against the spring forces $F_1$ and $F_2$ of the springs 16 and 12. In order to achieve this, P must be at least equal to $F_1$ and $F_2$. $F_1$ and $F_2$ in this case, at least in the position of rest of the device, are constant. The oil pressure P, however, varies on the one hand with the number of revolutions of the pump 17, i. e. with the speed of the car, and on the other hand with the width of the throttling aperture 21. At a given number of revolutions of pump 17, the pressure prevailing in the cylinder 15 is inversely proportional to the width of the throttling aperture 21, i. e. the number of revolutions per minute of the pump required to move the piston 14 by the oil pressure P rises with the width of the throttling aperture. For instance, the lever 28 may admit adjustment of the throttling pin 23 in such a way that in case of the smallest cross section at 21 the piston 14 is moved to the right at a speed of the vehicle of 40 kms. per hour, i. e. pre-selection from direct to over-drive is effected, while in case of the largest cross section the critical speed for the shifting or the pre-selection is reached only at 120 kms. per hour.

In Figure 3 the two gear positions (direct transmission = IIIrd speed, over-drive = IVth speed) are shown in dependance on the speed of the car. The line $a_1$ denotes the up-shifting (or in this case the pre-selecting) in case of adjustment of the lowest rate of speed $v_1$, $a_2$ denotes the up-shifting in case of adjustment of the highest maximum rate of speed $v_a$. In case of the adjustment of an average aperture of the throttling device, the shifting or pre-selection takes place at an average rate of speed of the car corresponding to the degree of throttling, within the adjusting range $b$ between $v_1$ and $v_2$.

By the pre-selecting, i. e. by the adjustment of the piston 14, at first only the lever 11 is moved to the left, so that the spring 12 moves past the pivot 9 on the right and thereby exerts on the lever 10 a torque acting likewise to move the same to the right. The real shifting takes place only when the speed of the shaft 5 has fallen at least to the speed of the shaft 6, i. e. in general by shutting off or throttling down the gas. In this instance jerky shifting from direct transmission to over-drive takes place (where friction couplings are used instead of claw couplings, direct gear shifting may be provided instead of pre-selecting).

On completion of the pre-selecting or shifting operation, the spring 12 acts on piston 14 in the direction of the oil pressure and against the action of the spring 16, so that $P = F_1 - F_2$. The oil pressure P upon the piston 14, compared to the critical pressure in up-shifting, must fall to a lower pressure in order to permit re-shifting of the piston 14 or re-selection of the direct drive of the gear. According to the characteristic of springs 12 and 16 in proportion to the dimensions of the piston 14, the pressure difference or the ratio of the critical speeds in up-shifting on the one hand and in down-shifting on the other hand, i. e. the width of the hysteresis loop marked by the hatching in Figure 3 is determined. Thus, for instance, it has been assumed according to the diagram of Figure 3 that in case of up-shifting ($a_2$) at $v_2 = 120$ kms. per hour, the down-shifting ($a_2'$) takes place at a speed of $v_2'=90$ kms. per hour ($=0.75v_2$) while proportionally thereto in case of adjustment of a minimum speed the up-shifting ($a_1$) takes place at $v_1=40$ kms. per hour and the down-shifting ($a_1'$) takes place at $v_1'=0.75v_1=30$ kms. per hour.

Moreover, independently thereof, down-shifting is possible by the gas lever 34. For instance, if the over-drive gear has been engaged (or pre-selected), i. e. piston 14 has been moved to its right hand end position and the gas lever 34 is depressed beyond its full out position B, the oil supplied to the throttling device 21 by the pump 17 is allowed to flow through a non-throttled channel by the check valve 31 which is now open. Thus the oil pressure in the cylinder is dropped directly and the direct transmission is engaged (or pre-selected) independently of the throttling effect of the throttling cross section 21 and independently of the actual speed of the car. As the gas lever is returned beyond the position B, the shut-off valve 31 is closed again, whereby the oil pressure is set up again and so the over-drive gear is re-engaged (or pre-selected again), provided that the speed of the car is still above the adjusted critical speed.

In the embodiment shown in Figure 2 the pressure pipe 19 of pump 17 leads to a cylinder 15' in which slides a piston 14' connected to a control slide valve 35 and loaded by the spring 16'. Arranged in the branch pipe 20 is a throttle valve 23' including a throttle channel 21' connecting the pipe 20 with the return pipe 22. Through a rod 26' the throttle valve 23' is connected to a hand lever 28' in the vicinity of the driver's seat. The hand lever 28' can again be locked in different positions between $x_1$ and $x_2$ at 29' or it may be adjusted continuously, thus releasing a larger or smaller throttle cross section through 21', in such a manner that a minimum cross section is released in position $x_1$ and a maximum cross section is released in position $x_2$.

Moreover, two pipes 36 and 37 are branched off from pipe 19 and alternately connected, through a control slide valve 35, with pipes 38 and 39. To this end, two transverse bores 40 and 41 are arranged in the control slide valve 36, bore 40 connecting the pipes 36 and 38 if the slide valve 35 (as shown) is moved to its right hand end position, while the bore 41 connects the pipes 37 and 39 in the left hand end position of the slide valve. The pipes 38 and 39 lead to a cylinder 42, i. e. pipe 38 leads to the left hand piston side 43, and pipe 39 to the right hand side 44 thereof. Depending on its end position the piston 45 engages through the rod 46 alternately either of the two speeds of the gear, which may be, e. g., a planetary gear or the like. Depending on the end position of the slide valve 35, a groove 47 with transverse bore 48 connects one of the two pipes 38 and 39 with the pipe 49 or with the return pipe 22. Connected to the hand lever 29' is a lever 50 loading through a piston 51 and a spring 52 a locking ball 53 adapted to engage in one of two recesses 54 or 55 in the slide valve 35.

The control slide valve 35 is loaded by a spring 56 which in turn is supported by a piston 57. Piston 57 can be moved by a lever 58 against the action of a spring 56, whereby the spring 56 is more or less tensioned and thus the piston 14' is further loaded in addition to the load by spring 16'. The lever 58 is arranged in such a way that it is operated by the gas lever 34 in case the same is stepped down beyond the full load position B.

The operation according to Figure 2 is as follows:

At a low speed of rotation of the pump 17, i. e. at a low speed of the car, the piston 14' and the control slide valve 35 are in their left hand end position (not shown). The bore 41 connects the pipes 37 and 39, so that the right hand piston side 44 is set under pressure, while the left hand piston side 43 is connected, through 38, 47, 48, 49, with the return pipe 22, thus being relieved from pressure. Thus, piston 45 is moved to the left and a lower speed, for instance, direct transmission, is engaged.

At a critical speed of the car determined by the position of the throttle valve 23' the pressure in pipe 19 or in cylinder 15' reaches such a value that it is able to overcome the counterpressure of the spring 16' or 56 as well as the pressure additionally exerted in the notch 55 by the spring 52. The piston 14' with the control slide valve 35 is moved to the right hand end position (as shown in Figure 2), bore 40 connecting the pipes 36 and 38, while pipe 39 is connected, through 47, 48, with the return pipe 49, 22. The piston 45 moves to the position shown in Figure 2, thus engaging the over-drive gear. By adjusting the lever 28' it is again possible to adjust selectively the critical pressure or the critical speed at which the automatic shifting is to take place, for instance, again within a range of 40 to 120 kms. per hour. For example shifting to over-drive may have taken place with minimum throttling at $v_2=120$ kms. per hour. If the speed of the car is now reduced, the down-shifting under action of the springs 16' and 56 alone would take place at the same speed of the car as the up-shifting to over-drive (provided there would be no friction in the system). This, however, is prevented by the notch device 51, 52, 53, which in this position of the control slide valve 35 engages in the notch 54 and opposes the movement of the control slide valve to the left (same as in the previous motion to the right). Therefore, the down-shifting again will take place only at a predetermined lower speed of the car, e. g. only at $v_a'$. The resistance in the notch in this case depends on the pressure of the spring 52, which in case of movement of the hand lever 28' into the position $x_2$ (minimum throttling effect at 21' and maximum speed of the car) is tensioned most and in case of movement of the hand lever to the position $x_1$ (maximum throttling effect at 21' and minimum speed of the car) is tensioned least. Thus, by suitable dimensioning and adjustment of the tension of the spring 52 it is again possible to adapt the hysteresis loop to the respective critical speeds that have been selected.

Instead of tensioning the spring 52 directly by the hand lever 29', it is also possible to provide for this purpose a gear mechanism exerting no reaction pressure, or an auxiliary force. For example, according to Figure 4, in addition to pump 17 a further pump 59 may be provided which may act on the piston 53' in cylinder 61, for instance, in a circulating system 60—62 which is independent on the constant throttle device 63 and whose delivery pressure may depend only on the speed of rotation of the pump or on the speed of the car.

The spring 56 is moreover dimensioned in such a way that on depression of the gas lever 34 to the position C, the spring is tensioned to such an extent that the slide valve 35 is moved to its left hand end position and thus the lower speed is engaged.

By way of alternative, the hydraulic shifting mechanism provided in the embodiments as shown may be substituted by any other suitable mechanical, hydraulic, pneumatic, electric or other control mechanism. Moreover a control mechanism according to the invention, instead of being provided between a gear for direct drive and an over-drive gear, may be provided also between two other speeds or in steps between several speeds.

Moreover the operation may be such (e. g. by suitable control of the pistons 51 or 53' or the like) that the hysteresis loop (indicated by the hatching in Figure 3) becomes any desired function of the adjusted critical speed at which the gear changing is to take place. For instance, a constant hysteresis loop of uniform width ($\Delta v = v_2 - v_2' = v_1 - v_1'' = $ const.) may be provided. Primarily in case of mechanical governors (for instance centrifugal governors) such an arrangement as a rule will have the advantage of simplicity.

While the invention has been described in detail with respect to certain now preferred examples and embodiments of the invention, it will be understood by those skilled in the art, that various changes and modifications may be made without departing from the spirit and scope of the invention and it is intended, therefore, to cover all such changes and modifications in the appended claims.

Having thus described my invention, I claim as new and desire to secure by Letters Patent:

1. A gear changing mechanism for change speed gears having a driving member and a driven member, for automatic change-over between a plurality of speeds, said mechanism comprising a control member transmitting the gear-changing movement, operating means for said control member operable in response to a speed condition of said driven member, first means operable at will to influence said operating means to vary the response thereof to said speed condition, and second means operable at will independently of said first means to inhibit the influence thereof on said operating means.

2. A control mechanism as in claim 1, in which the operating means comprise a hydraulic circulating system energized in dependence on the speed of said driven member, wherein the pressure of the hydraulic medium in said system determines the actuation of the control member, in which said first means comprise an adjustable throttle member for changing the hydraulic pressure in said hydraulic circulating system, and in which said second means comprise a by-pass valve by-passing said adjustable throttle member.

3. A control mechanism as in claim 1, in which the operating means comprise a hydraulic circulating system energized in dependence on the speed of the driven member and a control slide valve actuatable in automatic response to the pressure of the hydraulic medium in said system thereby controlling the actuation of the control member, and in which said first means are adapted to vary the pressure of said medium.

4. A control device as in claim 1 in combination with means acting on the operating means to cause shifting from one speed to another speed independently of the setting of the first means at a number of revolutions of the said driven member other than that of the opposite shifting operation.

5. In a control mechanism for change speed gears for vehicles, for automatic change between a plurality of speeds, a control member adapted to effectuate the gear changing, a second control member, means for non-positively interconnecting said two control members in such a manner that the change-over operation of the second control member only preselects a change-over operation of said first control member, i. e. establishes only preliminary conditions for the gear-changing operation, operating means depending on the speed of the vehicle and operating on said second control member, and adjusting means for said operating means, said adjusting means being adapted to control the dependence of the gear-changing operation of said second control member on the speed of the vehicle said means being so constructed and arranged that the actuating force exerted thereby on the second control member is reversed in direction as soon as a gear change occurs.

6. A control mechanism as in claim 1, in which said first means comprise a first adjusting member arranged at the driver's seat and a second adjusting member coupled with said first adjusting member and controlling the operation of said operating means.

7. A control mechanism for change speed gears for vehicles, for automatic gear changing at least between a lower and a higher rate of speed, comprising a control member transmitting the gear-changing motion, means for operating said control member in dependence on the speed of the vehicle, and adjusting means for said operating means, said adjusting means varying the dependence of the changing-over of the control member on the speed of the vehicle, whereby the automatic changing-over of the control member takes place at different speeds of the vehicle, in combination with means for governing the output of the driving motor of the vehicle and a device which in case of adjustment of said output governing means to a position in excess of wide open throttle acts upon said operating means in such a manner that in case of engaged higher speed the gear is changed over to the lower speed.

8. A control mechanism for change speed gears for vehicles, for automatic gear changing at least between a lower and a higher speed, comprising a control member transmitting the changing-over motion, means for operating said control member in dependence on the speed of the vehicle, said operating means comprising substantially a circulating system for a hydraulic medium energized under control of the speed of the vehicle, the hydraulic pressure in the circulating system controlling the operation of the control member, and a controllable adjusting device for regulating the pressure of the hydraulic medium and operable from the driver's seat, means for governing the output of the driving motor of the vehicle and a device cooperating with said governing means which upon adjustment of the output governing member to a high motor output, varies the pressure of the hydraulic medium in such a manner that the gear is shifted from an engaged relatively high speed to a lower speed.

9. A control mechanism as in claim 8, in which the adjusting means comprise an adjustable throttle device in the hydraulic circulating system, and in which said device cooperating with the output governing device comprises means for short-circuiting the throttle device.

10. A control mechanism as in claim 8 in which the operating means comprise a control slide valve controlling the flow of the liquid to the control member and loaded by the hydraulic pressure, and in which the device cooperating with the output governing member comprises a spring mechanism loading the control slide valve in a direction opposed to the action of the hydraulic pressure and varying the load of the control slide valve in such a manner that when the output governing member is adjusted to a high output and a higher speed is engaged the gear is shifted to a lower speed.

11. Shifting device of motor vehicle change speed transmissions having a driving member and a driven member, comprising two gear drive members, a change-over coupling constructed and arranged to connect either of the drive members with the driven member thereby to enable shifting between high and low gears, a snap-action spring mechanism for actuating the coupling and retaining it resiliently in either position of engagement, an actuating mechanism for the snap-action mechanism including auxiliary power means operative in opposition to the spring of the snap-action mechanism thereby to shift the transmission from low to high gear upon an increase of force exerted by the auxiliary power means, means driven by the driven member for energizing the auxiliary power means as a function of the speed of rotation of the driven member, and means operable at will from the driver's seat for varying the dependence of said auxiliary power means and thereby the dependence of automatic change-over from the speed of rotation of the driven member.

12. Shifting device as in claim 11 further comprising spring means constantly urging the actuating mechanism into engagement with the auxiliary power means whereby the spring of the snap-action mechanism opposes the auxiliary power means in one position and the spring means in the other position of the change-over coupling.

13. Shifting device for change speed transmissions of motor vehicles having a driving member and a driven member and comprising a shift member for shifting between relatively low and high gears, an actuating piston for the shift member, spring means acting on one side of the piston in the direction of shifting from the high to the low gear, a pump driven by the driven member and constructed and arranged to supply a fluid at a pressure dependent upon the speed of the driven member, conduit means for delivering fluid from the pump to the other side of the piston, return conduit means for the fluid, a throttle valve in the return conduit means, means operable from the driver's seat for regulating the throttle valve, a by-pass circumventing the throttle valve, a valve in the by-pass, and means operable from the driver's seat for actuating the valve in the by-pass.

14. Shifting device for change speed transmissions of motor vehicles having a driving member and a driven member and comprising a shift member for shifting between relatively low and high gears, an actuating piston for the shift member, spring means acting on one side of the piston in the direction of shifting from the high to the low gear, a pump driven by the driven member and constructed and arranged to supply a fluid at a pressure dependent upon the speed of the driven member, conduit means for delivering fluid from the pump to the other side of the piston, return conduit means for the fluid, a throttle valve in the return conduit means, the throttle valve being axially movable to vary the throttle effect thereof, an actuating mechanism for the throttle valve comprising a rotatable shaft, a manually adjustable lever arm on the shaft operable from the driver's seat and a transmission between the shaft and throttle valve for converting rotation of the shaft into axial movement of the valve.

15. Shifting device for change speed transmissions of motor vehicles having a driving member and a driven member, comprising two gear drive members, a changeover coupling constructed and arranged to connect either of the drive members with the driven member thereby to enable shifting between high and low gears, an actuating piston for the coupling, spring means acting on one side of the piston in the direction of shifting from high to low gear, a pump driven by the driven member and constructed and arranged to supply a fluid pressure dependent upon the speed of the driven member, conduit means for delivering fluid from the pump to the other side of the piston, return conduit means for the fluid, a throttle valve in the return conduit means, means operable from the driver's seat for regulating the throttle valve, a by-pass circumventing the throttle valve, a valve in the by-pass, and means operable from the driver's seat for actuating the valve in the by-pass.

16. Shifting device as in claim 13 wherein the means operable from the driver's seat for actuating the valve in the by-pass comprises a gas pedal, and further comprising yieldable means positioned in the path of movement of the gas pedal yieldably resisting actuation of the valve by the pedal upon depression of the pedal beyond a predetermined position of gas feed.

References Cited in the file of this patent

UNITED STATES PATENTS

| Number | Name | Date |
|---|---|---|
| 794,899 | Sturtevant | July 18, 1905 |
| 1,645,178 | Hall-Brown | Oct. 11, 1927 |
| 1,819,237 | Fleischel | Aug. 18, 1931 |
| 1,861,008 | Hayes | May 31, 1932 |
| 1,870,341 | Maybach | Aug. 9, 1932 |
| 2,102,781 | Bieretz | Dec. 21, 1937 |
| 2,120,104 | Livermore | June 7, 1938 |
| 2,151,714 | Pavesi | Mar. 28, 1939 |
| 2,446,087 | Hobbs | July 27, 1948 |
| 2,516,208 | Hasbany | July 25, 1950 |
| 2,567,152 | Hunter | Sept. 4, 1951 |
| 2,590,232 | Chilton | Mar. 25, 1952 |
| 2,606,456 | Dodge | Aug. 12, 1952 |